United States Patent
Frank

(10) Patent No.: US 8,470,908 B2
(45) Date of Patent: Jun. 25, 2013

(54) USE OF POLYMER ISOACETALS IN PRINTING INK FORMULATIONS

(75) Inventor: Michael Frank, Nieder-Olm (DE)

(73) Assignee: Kuraray Europe GmbH, Frankfurt (DE)

( * ) Notice: Subject to any disclaimer, the term of this patent is extended or adjusted under 35 U.S.C. 154(b) by 64 days.

(21) Appl. No.: 13/166,946

(22) Filed: Jun. 23, 2011

(65) Prior Publication Data

US 2012/0022207 A1    Jan. 26, 2012

(30) Foreign Application Priority Data

Jul. 21, 2010    (EP) .................................... 10170305

(51) Int. Cl.
*C09D 11/10*    (2006.01)
*C08L 29/14*    (2006.01)

(52) U.S. Cl.
USPC ......................................... 523/160; 524/557

(58) Field of Classification Search
USPC ................... 523/160, 161; 524/557
See application file for complete search history.

(56) References Cited

U.S. PATENT DOCUMENTS

2004/0157987 A1*  8/2004  Miyake et al. ................. 525/33

FOREIGN PATENT DOCUMENTS

| EP | 1801132 A1 | 6/2007 |
| EP | 2325001 A1 | 5/2011 |
| JP | 63303361 A | 12/1988 |
| JP | 2080288 A | 3/1990 |
| WO | 2007071770 A1 | 6/2007 |
| WO | 2009132987 A2 | 11/2009 |

OTHER PUBLICATIONS

Naofumi Nakurama; Kimihiro Suzuki: "Study on Ketalization Reaction of Poly(vinyl alcohol) by Ketones. VIII. Kinetic Study on Acetalization and Ketalization Reactions of Poly(vinyl alcohol)" J. Pol. Sci., vol. 34, 1996, pp. 3319-3328.
Database WPI Week 198904, Thomson Scientific, London, GB; AN 1989-028845 (XP002608697).
Database WPI Week 199018, Thomson Scientific, London, GB; AN 1990-134549 (XP002608698).

* cited by examiner

*Primary Examiner* — Vu A Nguyen
(74) *Attorney, Agent, or Firm* — Brooks Kushman P.C.

(57) ABSTRACT

Printing ink formulations containing polyvinyl isoacetals as a binder component exhibit lower solution viscosity and higher binder $T_g$, allowing use of more binder and more pigment, thus increasing depth of color and printing speed, as well as lowering the risk of delamination and ruboff.

9 Claims, 1 Drawing Sheet

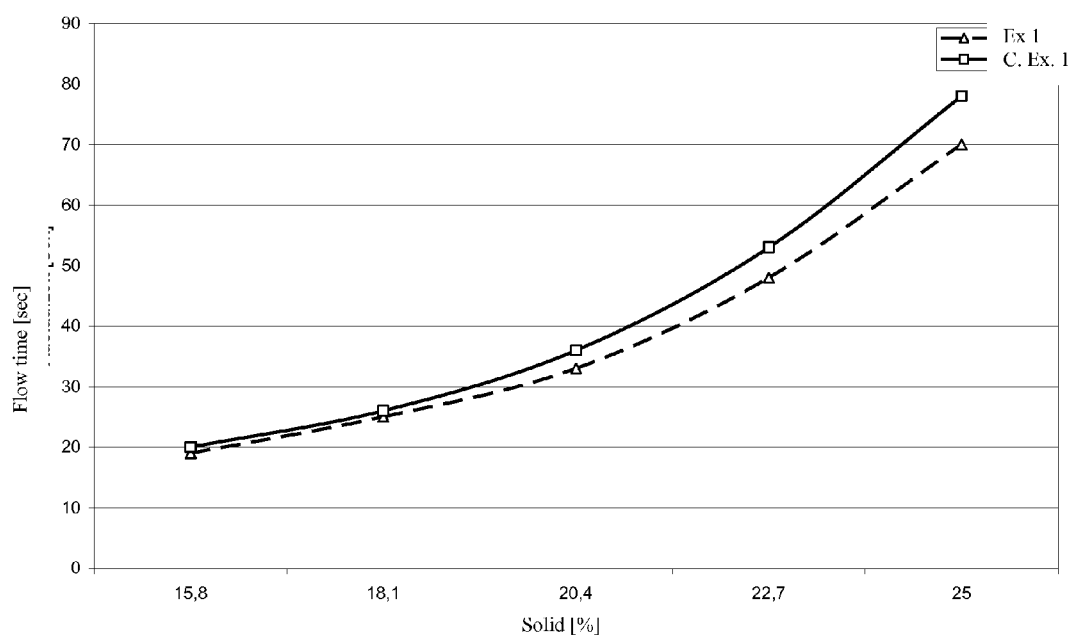

USE OF POLYMER ISOACETALS IN PRINTING INK FORMULATIONS

CROSS-REFERENCE TO RELATED APPLICATION

This application claims priority to European Patent Application No. EP 10170305.6, filed Jul. 21, 2010, which is herein incorporated by reference.

BACKGROUND OF THE INVENTION

1. Field of the Invention

The invention relates to the use of polyvinyl isoacetals, which are obtainable by reacting polyvinyl alcohol with branched aliphatic aldehydes, in formulations for printing inks.

2. Background Art

The use of polyvinyl acetals, in particular polyvinyl butyrals, as binders in printing ink formulations has long been known.

For this purpose, polyvinyl acetals which exhibit minimal viscosity in solution are often used (for example as binding agents in flexographic printing inks). At the same time it is thus possible to achieve a high content of pigment and binding agent in the printing ink, which then leads to a desired high intensity of colour.

During the production of such polyvinyl acetals, a correspondingly low-viscosity polyvinyl alcohol is normally selected as a starting material and is then acetylated, normally with n-butyraldehyde. Drawbacks of this approach include the tendency towards decreasing conversion rates and difficulties in the production of the product owing to the low glass transition temperature, which accompanies the low molecular weight, and the increasing tackiness associated with this. The low Tg (<65° C.) typical of low-viscosity polyvinyl acetals can also lead to difficulties in the end application, such as when printing the inks.

Many chemically different polyvinyl acetals have already been proposed for use in printing inks. It is thus known to use copolymers of tertiary vinyl esters with vinyl acetate as a starting material for the production of polyvinyl acetals, these copolymers comprising tertiary ester functions as impurities in the molecule. It is further known, in addition to butyraldehyde, to use long-chain aldehydes containing 5 to 10 carbon atoms for acetalation. Long-chain molecules such as sugar or oligoglycols can also react with the polymer chain, either after or during acetalation, and also act as impurities.

A drawback of these methods is the high complexity and the considerably higher costs compared to the acetalation of polyvinyl alcohol with butyraldehyde, which is established on an industrial scale.

SUMMARY OF THE INVENTION

It would therefore be desirable to have a polyvinyl acetal provided for printing ink formulations which simultaneously has a high Tg and low viscosity, but otherwise does not differ significantly from the known polyvinyl butyrals in terms of its properties, above all with regard to polarity and production methods.

The butyraldehyde used for industrial production of polyvinyl butyral consists exclusively of n-butyraldehyde. This is presumably produced on an industrial scale by hydrocarbonylation of propene (oxo method), whereby thermodynamically controlled n-butanal is obtained almost exclusively.

Polyvinyl butyrals produced by acetalation of polyvinyl alcohol with iso-butyraldehyde are known compounds (for example from Fitzhugh, Crozier, J. Pol. Sci. Vol. VIII, No. 2, p. 225-241 and Nakamura, Suzuki, J. Pol. Sci, Vol. 34, p. 3319-3328(1996)), but are of no technical significance owing to the poor industrial availability of iso-butyraldehyde compared to n-butyraldehyde.

It has surprisingly been found that polyvinyl butyrals based on iso-butyraldehyde have the required properties, such as glass transition temperature and low viscosity, but at the same time do not exhibit any significant change in polarity and therefore act as effective pigment wetting agents and are thus well adapted for use in printing inks. Without wanting to be bound to any particular theory, it is supposed that this can be explained by branching of the molecule.

BRIEF DESCRIPTION OF THE DRAWINGS

FIG. 1 compares the ethanol solution viscosity of a polyvinyl isoacetal of one embodiment of the invention with an n-butyral polyvinyl n-butyral.

DETAILED DESCRIPTION OF THE PREFERRED EMBODIMENTS

Owing to the use of, for example, iso-butyraldehyde instead of the conventional n-butyraldehyde for acetalation of polyvinyl alcohol, a polyvinyl acetal is obtained which has a lower viscosity and a higher glass transition temperature compared to a comparative product of identical chemical composition based on n-butyraldehyde. This class of compound will be referred to hereinafter as polyvinyl isoacetals.

The invention relates to the use of polyvinyl isoacetals as a binder in printing ink formulations, the acetal group of the polyvinyl isoacetals resulting from one or more aliphatic keto compounds containing 4 to 10 carbon atoms with at least one branch in the position alpha or beta to the keto group.

Owing to the inventive use of polyvinyl isoacetals in printing ink applications, the advantage of a low viscosity with the same binder content is achieved as compared to using polyvinylacetals with n-acetal groups. Since pigment and binding agent are present in a printing ink/printing ink concentrate at a specific ratio (often 1:1.2), the amount of pigment and binding agent cannot be increased in an arbitrary manner with a predetermined final viscosity of the printing ink. If a binding agent of relatively low viscosity is provided, the contribution thereof to the total viscosity is also lower to start with. The pigment content can thus be increased. At the same time slightly more binding agent must also be added. However, the total viscosity does not exceed the predetermined maximum value. More pigment and binding agent are contained in the system, however, and therefore a greater intensity of colour is achieved.

A further advantage is provided in the form of the increased Tg of the polyvinyl isoacetals compared to conventional n-acetals. This is important in printing inks since a greater resistance to temperature means a lower level of tackiness and subsequent softening of the printing ink on the surface. Premature softening could possibly lead to delamination in lamination printing inks. In the case of surface printing, too, (e.g. drink cartons) premature softening of the printing ink may be disadvantageous. Drink cartons may stick to one another or the inks may be destroyed.

Polyvinyl isoacetals according to the invention are preferably obtained by reacting polyvinyl alcohols with one or more aliphatic aldehydes containing 4 to 10 carbon atoms with at least one branch in the position alpha or beta to the aldehyde group.

Within the scope of the present invention, polyvinyl acetals are preferably used wherein the acetal group is derived from one or more aliphatic aldehydes or keto compounds of the group comprising iso-butyraldehyde, iso-valeraldehyde, (alpha)-isovaleraldehyde [2-methylbutanal], (beta)-isovaleraldehyde [3-methylbutanal] and pivalinaldehyde [2,2-dimethylpropanal].

The polyvinyl isoacetals can optionally be obtained by simultaneous reaction of polyvinyl alcohols with a) one or more aliphatic keto compounds containing 3 to 10 carbon atoms with at least one branch in the position alpha or beta to the keto group, and b) one or more further aliphatic keto compounds containing 2 to 10 carbon atoms.

The content of acetal groups in the polyvinyl isoacetal prepared from aliphatic keto compounds containing 4 to 10 carbon atoms with at least one branch in the position alpha or beta to the keto group can be 20 to 95 mol %, preferably 50 to 90 mol % based on the total acetal groups of the polyvinyl acetals when further aliphatic keto compounds containing 2 to 10 carbon atoms are also used. Acetalaldehyde and/or n-butyraldehyde are preferably used as a further aliphatic keto compound.

Polyvinyl isoacetals used in accordance with the invention preferably exhibit a level of viscosity which is at least 10% lower than that of the corresponding polyvinyl (n)acetals. Of course, for this comparison reference must be made to polyvinyl isoacetals and polyvinyl (n)acetals which, except for the n/iso acetal groups, are otherwise chemically identical or highly similar. The viscosity is determined by one of the methods mentioned in the examples.

In addition to the polymeric binder, conventional constituents of the printing ink formulations are pigments, solvents and optionally additives such as waxes and co-binding agents (ketone resins, urethanes, etc.), as well as dispersing agents and adhesion promoters. In accordance with the invention, polyvinyl isoacetals are used in an amount of 1 to 30% by weight, based on the printing ink formulations.

Within the scope of the present invention it is also possible to use mixtures of polyvinyl isoacetals and the polyvinyl acetals comprising n-acetal groups, known from the prior art, as a binder for printing inks.

The invention therefore further relates to a mixture of polyvinyl isoacetals comprising at least one further polyvinyl acetal as a binder in printing ink formulations, the acetal group of the polyvinyl isoacetal resulting from one or more aliphatic keto compounds containing 4 to 10 carbon atoms with at least one branch in the position alpha or beta to the keto group, and the at least one further polyvinyl acetal being obtained by reacting polyvinyl alcohol with one or more further aliphatic keto compounds containing 2 to 10 carbon atoms.

The embodiments described for the use of polyvinyl isoacetals also apply to the use in a mixture with conventional polyvinyl acetals.

The further polyvinyl acetals are preferably obtained by reacting, for example, acetaldehyde and/or n-butyraldehyde with polyvinyl alcohols. The reaction conditions correspond to those of polyvinyl isoacetals. A mixture of polyvinyl isoacetal, which is obtainable by reacting polyvinyl alcohols with iso-butyraldehyde, and polyvinyl acetal, which is obtainable by reacting polyvinyl alcohols with n-butyraldehyde, may be used.

The mixtures in accordance with the invention preferably contain 10 to 90% by weight of polyvinyl isoacetals and 90 to 10% by weight of further polyvinyl acetals, in particular 50% by weight of each.

The methods for producing polyvinyl isoacetals do not differ substantially from those used to produce polyvinyl acetals with n-acetal groups. Polyvinyl acetals used in accordance with the invention are obtainable by reacting at least one polyvinyl alcohol with at least one of the mentioned keto compounds under acid catalysis. This reaction is known to those skilled in the art and can be derived, for example, from WO 2009/132987 A1 or EP 09175666.8.

When producing polyvinyl acetals the polyvinyl alcohol is normally first dissolved in water with heating and is placed in the reaction vessel at a temperature of approximately 0 to 20° C. For this purpose an acid ($HCl$, $HNO_3$ or $H_2SO_4$) is added in a first method, or in a further method one or more keto compounds or aldehydes is/are added. Iso-butyraldehyde is preferably used as a keto compound or aldehyde, polyvinyl isobutyral being obtained.

Depending on the particular method, the desired keto compounds are added at the aforementioned temperature to a mixture of polyvinyl alcohol and acid, or an acid is added at the aforementioned temperature to a mixture of polyvinyl alcohol and keto compound. The respective addition is carried out until the desired degree of acetalation of the polyvinyl acetal has been achieved and this precipitates as a solid from the reaction mixture. The addition of the acid or keto compounds in method step a) can be achieved over various dosing times and/or with a dosing break.

In order to complete the reaction, the reaction mixture is heated in a second step b) to 30 to 90° C., preferably 35 to 80° C. and is kept at this temperature for a specific period of time. In addition to completion of the acetalation reaction, intramolecular re-acetalation with the formation of acetal and alcohol domains may also occur during this 'heat modification'.

The polyvinyl isoacetals used in accordance with the invention preferably have a residual alcohol content of 10% to 30%, more preferably 15% to 25% and/or a degree of acetalation of 62% to 89.5%, more preferably of 67% to 84.5%.

MEASUREMENT METHODS a) Determination of the Polyvinyl Acetal Content:

The polyvinyl acetal content is to be understood to be the content, in percent by weight, of acetyl groups arising from the use of the amount of caustic potash solution necessary to saponify 1 g of substance.

Determination Methods (In Accordance with EN ISO 3681):

Approximately 2 g of the substance to be examined are weighed out precisely to 1 mg in a 500 ml round-bottomed flask and are dissolved with 90 ml ethanol and 10 ml benzyl alcohol under reflux. After cooling, the solution is neutralised with 0.01 N NaOH against phenolphthalein. Subsequently, 25.0 ml of 0.1 N KOH are added and the solution is heated under reflux for 1.5 hours. The sealed flask is left to cool, and the excess base is back-titrated with 0.1 N hydrochloric acid against phenolphthalein as an indicator until decolouration persists. A blank is treated in the same manner. The PV acetate content is calculated as follows: PV acetate content [%]=(b−a)*86/E, where a=consumption of 0.1 N KOH for the sample in ml, b=consumption of 0.1 N KOH for the blank test in ml, and E=initial dry weight of the substance to be examined in g.

b) Determination of the Polyvinyl Alcohol Group Content

The polyvinyl alcohol group content (polyvinyl alcohol content) is the proportion of hydroxyl groups detectable by subsequent acetalation with acetic acid anhydride.

Determination Method (In Accordance with DIN 53240)

Approximately 1 g of polyvinyl acetal is weighed precisely to 1 mg into a 300 ml ground joint Erlenmeyer flask, 10.0 ml of acetic acid anhydride/pyridine mixture (23:77 v/v) is added and the mixture is heated to 50° C. for 15 to 20 hours. After cooling, 17 ml of 1,2-dichloroethane are added and the mixture is swirled briefly. Subsequently, 8 ml of water are added with stirring, the flask is sealed with a stopper, and the contents stirred for 10 minutes. The neck of the flask and the stopper are rinsed with 50 ml of deionised water, covered with a layer of 5 ml n-butanol, and the free acetic acid is titrated with 1 n sodium hydroxide solution against phenolphthalein. A blank is treated in the same manner. The polyvinyl alcohol content is calculated as follows: polyvinyl alcohol content [%]=(b−a)*440/E, where a=consumption of 1 N NaOH for the sample in ml, b=consumption of 1 N NaOH for the blank in ml, and E=initial dry weight of the substance to be examined in g.

c) Determination of Viscosity

The viscosity of the polyvinyl acetals used is determined in accordance with DIN 53015 in a solution in ethanol, n-butanol or MEK (methyl ethyl ketone) at 20° C. in a Höppler viscometer.

EXAMPLES

Pure and mixed polyvinyl isoacetals and polyvinyl acetals were each produced by acid-catalysed reaction of iso-butyraldehyde or n-butyraldehyde and the aldehyde mixtures of iso-butyraldehyde/acetaldehyde or n-butyraldehyde/acetaldehyde with the same polyvinyl alcohol, and their use in printing ink formulations was examined.

Example 1

540 g polyvinyl alcohol with a viscosity (4% in water) of 3.06 mPas and a degree of hydrolysis of 96.5 mol % were dissolved in 6660 ml water. After adding 340 g iso-butyraldehyde, the reaction was started at 4° C. with the addition of 870 ml 20% hydrochloric acid solution. Once the hydrochloric acid had been added, the reaction solution was heated over a period of 2 hours to 36° C. and was kept at this temperature for a further 2 hours. The precipitated solid was filtered off and washed sufficiently with water. For the purposes of neutralization or alkalization, the product suspension was mixed with 20 ml 10% sodium hydroxide solution and slightly heated again.

Comparative Example 1

540 g polyvinyl alcohol with a viscosity (4% in water) of 3.06 mPas and a degree of hydrolysis of 96.5 mol % were dissolved in 6660 ml water. After adding 340 g n-butyraldehyde, the reaction was started at 4° C. with the addition of 870 ml 20% hydrochloric acid solution. Once the hydrochloric acid had been added, the reaction solution was heated over a period of 2 hours to 36° C. and was kept at this temperature for a further 2 hours. The precipitated solid was filtered off and washed sufficiently with water. For the purposes of neutralization or alkalization, the product suspension was mixed with 20 ml 10% sodium hydroxide solution and slightly heated again. Excess base was removed by washing with water. The product was then dried.

Example 2

684 g polyvinyl alcohol with a viscosity (4% in water) of 4.60 mPas and a degree of hydrolysis of 98.5 mol % were dissolved in 6516 ml water. After adding 394 g iso-butyraldehyde, the reaction was started at 4° C. with the addition of 820 ml 20% hydrochloric acid solution. Once the hydrochloric acid had been added, the reaction solution was heated over a period of 2 hours to 44° C. and was kept at this temperature for a further 1.5 hours. The precipitated solid was filtered off and washed sufficiently with water. For the purposes of neutralization or alkalization, the product suspension was mixed with 20 ml 10% sodium hydroxide solution and slightly heated again. Excess lye was removed by washing with water. The product was then dried.

Comparative Example 2

684 g polyvinyl alcohol with a viscosity (4% in water) of 4.60 mPas and a degree of hydrolysis of 98.5 mol % were dissolved in 6516 ml water. After adding 394 g n-butyraldehyde, the reaction was started at 4° C. with the addition of 820 ml 20% hydrochloric acid solution. Once the hydrochloric acid had been added, the reaction solution was heated over a period of 2 hours to 44° C. and was kept at this temperature for a further 1.5 hours. The precipitated solid was filtered off and washed sufficiently with water. For the purposes of neutralization or alkalization, the product suspension was mixed with 20 ml 10% sodium hydroxide solution and slightly heated again. Excess base was removed by washing with water. The product was then dried.

Example 3

684 g polyvinyl alcohol with a viscosity (4% in water) of 9.94 mPas and a degree of hydrolysis of 98.4 mol % were dissolved in 6552 ml water. After adding 400 g iso-butyraldehyde, the reaction was started at 4° C. with the addition of 780 ml 20% hydrochloric acid solution. Once the hydrochloric acid had been added, the reaction solution was heated over a period of 2 hours to 48° C. and was kept at this temperature for a further 2 hours. The precipitated solid was filtered off and washed sufficiently with water. For the purposes of neutralization or alkalization, the product suspension was mixed with 20 ml 10% sodium hydroxide solution and slightly heated again. Excess base was removed by washing with water. The product was then dried.

Comparative Example 3

684 g polyvinyl alcohol with a viscosity (4% in water) of 9.94 mPas and a degree of hydrolysis of 98.4 mol % were dissolved in 6552 ml water. After adding 400 g n-butyraldehyde, the reaction was started at 4° C. with the addition of 780 ml 20% hydrochloric acid solution. Once the hydrochloric acid had been added, the reaction solution was heated over a period of 2 hours to 48° C. and was kept at this temperature for a further 2 hours. The precipitated solid was filtered off and washed sufficiently with water. For the purposes of neutralization or alkalization, the product suspension was mixed with 20 ml 10% sodium hydroxide solution and slightly heated again. Excess base was removed by washing with water. The product was then dried.

Example 4

Mixed Acetal Formed of iso-BuA+AcA 720 g polyvinyl alcohol with a viscosity (4% in water) of 3.06 mPas and a degree of hydrolysis of 96.5 mol % were dissolved in 6480 ml water. After adding 152.2 g acetaldehyde and 204.2 g iso-butyraldehyde, the reaction was started at 8° C. with the addition of 1330 ml 20% hydrochloric acid solution. Once the hydrochloric acid had been added, the reaction solution was heated over a period of 2 hours to 36° C. and was kept at this temperature for a further 2 hours. The precipitated solid was filtered off and washed sufficiently with water. For the purposes of neutralization or alkalization, the product suspension was mixed with 40 ml 10% sodium hydroxide solution and slightly heated again. Excess base was removed by washing with water. The product was then dried.

Comparative Example 4

Mixed Acetal Formed of n-BuA+AcA 720 g polyvinyl alcohol with a viscosity (4% in water) of 3.06 mPas and a degree of hydrolysis of 96.5 mol % were dissolved in 6480 ml water. After adding 152.2 g acetaldehyde and 204.2 g n-butyraldehyde, the reaction was started at 8° C. with the addition of 1330 ml 20% hydrochloric acid solution. Once the hydrochloric acid had been added, the reaction solution was heated over a period of 2 hours to 36° C. and was kept at this temperature for a further 2 hours. The precipitated solid was filtered off and washed sufficiently with water. For the purposes of neutralization or alkalization, the product suspension was mixed with 40 ml 10% sodium hydroxide solution and slightly heated again. Excess base was removed by washing with water. The product was then dried.

Solutions were produced from the products obtained from the examples/comparative Examples 1 to 4 and the viscosity of these solutions was examined. Furthermore, these products were characterised analytically. The results are shown in Table 1.

The product from Example 1 and Comparative Example 1 were examined in a printing ink application. The results are displayed in Tables 2 and 3.

It was found that all polyvinyl isoacetals exhibit a lower viscosity compared to the polyvinyl acetals, and a higher solid content consisting of pigment and binding agent can thus be achieved in the printing ink formulation with a predetermined maximum viscosity. A greater intensity of colour can thus be achieved. According to the results obtained, all polyvinyl isoacetals have a higher glass transition temperature compared to the polyvinyl acetals. This leads, in the end application, to considerably reduced undesirable tackiness.

As shown in FIG. 1, the polyvinyl isobutyraldehyde acetal dissolved in ethanol at the solid concentrations which are normally used to produce printing ink concentrates (>20%) delivers a considerably lower solution viscosity. This makes it possible, with a predetermined viscosity of a colour concentrate or a printing ink, to use more binding agent and pigment. Greater intensities of colour are thus obtained with the same printing viscosity. This greater intensity in colour makes it possible to use quicker printing speeds, which leads to higher throughputs and thus saves time during the printing process.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. In a printing ink composition containing a binder, the improvement comprising including at least one polyvinyl isoacetal as a binder, wherein the acetal group of the at least one polyvinyl isoacetal is derived from one or more aliphatic keto compounds containing 4 to 10 carbon atoms having at least one branch in a position alpha or beta to the keto group, and is prepared by simultaneous reaction of at least one polyvinyl alcohol with
   a) one or more aliphatic keto compounds containing 4 to 10 carbon atoms with at least one branch in the position alpha or beta to the keto group, and
   b) one or more further aliphatic keto compounds different from a) containing 2 to 10 carbon atoms.

2. The printing ink composition of claim 1, wherein at least one compound selected from the group consisting of iso-butyraldehyde, iso-valeraldehyde, (alpha)-isovaleraldehyde [2-methylbutanal], (beta)-isovaleraldeyhde [3-methylbutanal] and pivalinaldehyde [2,2-dimethylpropanal] is used as an aliphatic keto compound containing 4 to 10 carbons atoms with at least one branch in the position alpha or beta to the keto group.

3. The printing ink composition of claim 1, wherein the polyvinyl isoacetal has a residual alcohol content of 10 mol % to 30 mol %.

4. The composition of claim 1, wherein the polyvinyl isoacetal has a degree of acetalation of 62% mol to 89.5 mol %.

5. The printing ink composition of claim 1, wherein the polyvinyl isoacetal exhibits a viscosity which is at least 10% lower than that of a corresponding polyvinyl (n)acetal.

6. In a printing ink composition containing a binder, the improvement comprising including a binder comprising a mixture of polyvinyl acetals comprising at least one polyvinyl isoacetal wherein the acetal group of the polyvinyl isoacetal is derived from one or more aliphatic keto compounds containing 4 to 10 carbon atoms with at least one branch in the position alpha or beta to the keto group, and at least one

TABLE 1

Analysis results:

| | Ex. 1 | CEx. 1 | Ex. 2 | CEx. 2 | Ex. 3 | CEx. 3 | Ex. 4 | CEx. 4 |
|---|---|---|---|---|---|---|---|---|
| PVOH [% by weight] | 19.4 | 17.5 | 21.3 | 19.8 | 19.9 | 18.7 | 16.0 | 16.1 |
| PVOAc [% by weight] | 3.8 | 3.8 | 2.0 | 2.6 | 1.9 | 2.2 | 3.8 | 3.7 |
| Viscosity [mPas] in 10% ethanol | 15.7 | 17.7 | 40.3 | 45.2 | 185.1 | 229.6 | 17.1 | 19.5 |
| Viscosity [mPas] 10% n-butanol | 40.8 | 43.1 | 101.8 | 115.5 | 520 | 712 | 42.3 | 46.7 |
| Viscosity [mPas] in 20% MEK | 33.6 | 41.8 | 213 | 375 | 3300 | 16500 | 37.8 | 48.4 |
| Tg [° C.] | 72 | 63 | 79 | 69 | 81 | 70 | 86 | 84 |

TABLE 2

Results of the printing ink examination:

Flow time [s], DIN 53211/4 mm/23° C.
Concentration of the ethanolic solutions

| Concentration | 15.0 | 17.5 | 20.0 | 22.5 | 25.0 |
|---|---|---|---|---|---|
| Example 1 | 19 | 25 | 33 | 48 | 70 |
| Comp. Ex. 1 | 20 | 26 | 36 | 53 | 78 |
| Example 4 | 14 | 17 | 22 | 31 | 50 |
| Comp. Ex. 4 | 15 | 18 | 24 | 35 | 56 |

TABLE 3

Flow time [s], DIN 53211/4 mm/23° C.
Concentration of the ethanolic solutions

| Concentration | 5.0 | 7.5 | 10.0 | 12.5 | 15.0 |
|---|---|---|---|---|---|
| Example 2 | — | — | 16 | 23 | 45 |
| Comp. Ex. 2 | — | — | 18 | 26 | 49 |
| Example 3 | 14 | 17 | 27 | 52 | 109 |
| Comp. Ex. 3 | 14 | 18 | 29 | 57 | 120 |

TABLE 4

| | Ex. 1 | CEx. 1 | Ex. 2 | CEx. 2 | Ex. 3 | CEx. 3 | Ex. 4 | CEx. 4 |
|---|---|---|---|---|---|---|---|---|
| Gloss on OPP 60 degrees [°] | 75 | 78 | 80 | 79 | 77 | 73 | 72 | 70 |
| Flow time of colour concentrate [sec] const. pigm/binding agent ratio | 47 | 53 | 72 | 80 | 105 | 121 | 37 | 41 |
| Rel. intensity of colour [%] - 25 s printing ink | 100.0 | 94.1 | 100.0 | 95.6 | 100.0 | 97.2 | 100.0 | 94.7 |
| Pigment content - 25 s printing ink | 12.2 | 11.2 | 10.8 | 9.2 | 8.2 | 6.9 | 12.4 | 11.3 |
| Adhesion test - peel off - 25 s printing ink | 1.99 | 1.53 | 1.96 | 1.66 | 1.85 | 1.51 | 1.78 | 1.41 | further polyvinyl acetal obtained by reacting polyvinyl alcohol with one or more further aliphatic keto compounds containing 2 to 10 carbon atoms and having no branch in a position alpha or beta to the keto group.

7. The printing ink composition of claim 6, wherein the polyvinyl isoacetals are obtained by reacting polyvinyl alcohols with iso-butyraldehyde, and the polyvinyl acetals are obtained by reacting polyvinyl alcohols with n-butyraldehyde.

8. The printing ink composition of claim 6, wherein the polyvinyl isoacetals are obtained by reacting polyvinyl alcohols with iso-butyraldehyde, and the polyvinyl acetals are obtained by reacting polyvinyl alcohols with acetaldehyde.

9. The printing ink composition of claim 6, wherein the polyvinyl isoacetals are obtained by reacting polyvinyl alcohols with iso-butyraldehyde, and the polyvinyl acetals are obtained by reacting polyvinyl alcohols with n-butyraldehyde and acetaldehyde.

\* \* \* \* \*